United States Patent
Bush et al.

(10) Patent No.: US 6,382,423 B1
(45) Date of Patent: May 7, 2002

(54) SELECTIVE REDUCTION OF NATURALLY OCCURRING RADIOACTIVE MATERIAL TO BE TREATED, AND ITS TREATMENT

(75) Inventors: John G. Bush, Duncanville; Siddhartha Gaur, Plano, both of TX (US)

(73) Assignee: BPF, Incorporated, Duncanville, TX (US)

( * ) Notice: Subject to any disclaimer, the term of this patent is extended or adjusted under 35 U.S.C. 154(b) by 0 days.

(21) Appl. No.: 09/303,915

(22) Filed: May 3, 1999

(51) Int. Cl.[7] .............................. B03D 3/00; B03B 1/00
(52) U.S. Cl. ............................. 209/3; 209/10; 209/12.1
(58) Field of Search .............................. 209/3, 4, 7, 10, 209/17, 576, 12.1

(56) References Cited

U.S. PATENT DOCUMENTS

| | | | |
|---|---|---|---|
| 2,396,938 A | | 3/1946 | Bersworth ...................... 134/2 |
| 3,625,761 A | | 12/1971 | Tate ............................... 134/3 |
| 3,684,720 A | | 8/1972 | Richardson ................... 252/86 |
| 4,077,874 A | * | 3/1978 | Conley ........................... 209/5 |
| 4,190,462 A | | 2/1980 | De Jong et al. ................ 134/2 |
| 4,646,978 A | * | 3/1987 | Johnson et al. ............. 209/576 |
| 4,708,805 A | | 11/1987 | D'Muhala ................... 210/698 |
| 4,783,253 A | * | 11/1988 | Ayres et al. ..................... 209/2 |
| 4,980,077 A | | 12/1990 | Morris et al. ................. 252/82 |
| 5,093,020 A | | 3/1992 | Paul et al. ..................... 252/82 |
| 5,127,586 A | * | 7/1992 | Oder ............................... 20/2 |
| 5,146,988 A | | 9/1992 | Paul ............................ 166/312 |
| 5,316,223 A | * | 5/1994 | Lahoda et al. ................ 109/18 |
| 5,436,384 A | * | 7/1995 | Grant et al. ................... 209/17 |
| 5,468,394 A | | 11/1995 | Bader ........................... 210/729 |
| 5,495,062 A | * | 2/1996 | Abel ............................... 209/2 |
| 5,550,313 A | | 8/1996 | Hayden ...................... 588/256 |
| 5,613,238 A | * | 3/1997 | Mouk et al. .................... 20/18 |
| 5,685,918 A | | 11/1997 | Tate .............................. 134/3 |
| 5,762,821 A | | 6/1998 | Tate ............................ 252/180 |
| 6,032,881 A | * | 3/2000 | Bass et al. ................... 209/214 |

OTHER PUBLICATIONS

Technical Proposal by BPF, Inc. entitled "On–Site Disposal of NORM", vol. 2 Technical, Jul 6, 1994.
E & P Environment—Jan. 7, 1994, article entitled "Less NORM means more savings for operators", Pasha Publications.

* cited by examiner

Primary Examiner—Katherine A. Matecki
(74) Attorney, Agent, or Firm—Gardere Wynne Sewell LLP; Matthew E. Burr; Sanford E. Warren, Jr.

(57) ABSTRACT

A method for processing a mass of solid fine particles including Naturally Occurring Radioactive Material ("NORM") is disclosed. In one embodiment, the material is sampled and classified into fractions based upon one or more selected criteria such as particle size or particle density. The level of radioactivity associated with each fraction is determined, leading to separation of the mass of fines into selected fractions based upon one or more selected criteria and the activity levels of the fractions. Selected fractions are chosen for chemical treatment, thereby reducing the volume of material to be treated. By reducing the volume of solid material to be treated, the amount of chemicals used for treatment is reduced, along with the size and capacity of the processing equipment required to treat the material. Radionuclides are extracted from the selected fractions into an aqueous solution which may be subsequently injected into a subterranean formation, such as the formation from which the materials originated. In one embodiment, the aqueous solution consists of water, a chelant comprising an alkali metal salt of a polyamine polycarboxylic acid, and sufficient alkali metal hydroxide to result in a pH of the aqueous solution of about 5 to about 14.

8 Claims, 2 Drawing Sheets

US 6,382,423 B1

SELECTIVE REDUCTION OF NATURALLY OCCURRING RADIOACTIVE MATERIAL TO BE TREATED, AND ITS TREATMENT

TECHNICAL FIELD

The present invention relates to a method for dividing the volume of a mass of solid fine particles containing Naturally Occurring Radioactive Materials ("NORM") according to activity levels, thereby reducing the amount of material requiring treatment, and the treatment of the material requiring it. The invention is particularly applicable to industries involved in the extraction of hydrocarbons and minerals from the earth where NORM-containing soil and precipitates generated during the extraction, processing, and storage of hydrocarbons and minerals must be treated. More specifically, the invention relates to a method for extracting and/or segregating materials containing NORM components from materials generated during the process of hydrocarbon or mineral recovery. In one application of the invention, NORM is separated from bulk solids, then placed in solution, and injected into a formation similar to the subterranean formation from which the material was originally extracted.

BACKGROUND OF THE INVENTION

Naturally Occurring Radioactive Materials ("NORM") include isotopes of uranium and thorium, and their decay chain daughters such as radium, radon, and lead. All of them are present in the earth's crust in immobile and mobile forms. NORM can be released from the earth's crust due to naturally occurring disturbances or human activity such as, for example, hydrocarbon recovery processes.

From a regulatory standpoint, only Technologically Enhanced Natural Radioactive materials ("TENR") require remediation. Technological enhancement is considered to be the concentration of radioactive substances through a process not intended to produce radioactive substances. As used herein, the term "NORM" will be understood to include TENR. In sufficient quantities and concentrations, NORM may present a health risk due to radiation exposure by its increasing the background levels of radiation. Consequently, the disposal of such materials is subject to regulation.

Water recovered or utilized in the process of extracting of hydrocarbons and other materials from substrates almost invariably includes alkaline metal ions of Group I–III elements of the Periodic Table such as cations of barium, strontium, calcium, and magnesium. Also present in the water, along with radioactive substances, are anions such as sulfate, bicarbonate, carbonate, phosphate, fluoride, chloride, and the like. Concentrations of anions and cations in the water, which exceed the solubility of salts formed from the anions and cations, will result in the precipitation of solid salts that may entrap accompanying radioactive substances.

Thus, a problem associated with the emergence of solids in many hydrocarbon and other production operations is the inclusion of NORM in those materials. For instance, NORM species are generated in significant quantities during many oil well drilling and hydrocarbon recovery processes. These NORM materials are present in the earth's crust as water soluble or insoluble constituents. The majority of water insoluble $U^{238}$ and $Th^{232}$ forms of NORM, remains in the earth's crust or substrate, while waiter soluble NORM materials such as $Ra^{226}$, $Ra^{228}$ and $R^{222}$ may be transported to ground level along with water produced during the oil drilling process.

For example, in the hydrocarbon recovery industry, and in various oil field operations, difficulties are often encountered in dealing with NORM contained in complex form in mineral materials including magnesium sulfate, barium sulfate, strontium sulfate, radium salts and the like. Most notably, the solid, barium sulfate, which has properties making it extremely difficult to treat, retains NORM. The most commonly encountered NORM materials associated with hydrocarbon drilling and recovery processes are isotopes of radium and radon. Uranium and thorium, themselves present in rocks and shales, are insoluble in reservoir fluids, and therefore largely immobile. On the other hand, Radium ($^{226}Ra$ and $^{228}Ra$) and Radon ($^{222}Rn$), radioactive species, components of NORM, are soluble in water.

During oil drilling operations or other hydrocarbon recovery processes, radioactive substances noted may be present in water associated with processes. During the transportation of fluids, these radioactive nucleotides may be encapsulated into a solid matrix. The encapsulation of these radioactive substances occurs with the precipitation of salts from the fluids as the physical or chemical conditions change. Such changes include a decrease in the proportion of water, thus an increase in the concentration of various ions, pressure decrease, and temperature decrease. Precipitation of these salts involves the formation of crystal structures that may encapsulate or entrap radioactive substances as impurities in mineral scales. The radioactive materials are entrapped during the crystal formation process.

Since NORM materials are typically encapsulated in a complex soil or mineral matrix, cost-effective removal and disposal of NORM materials require techniques to penetrate the soil and mineral matrix and extract the radioactive materials prior to release of the solid material. Treating NORM-containing waste material, especially in the case of waste material generated in hydrocarbon recovery, can present additional problems. Often such materials include debris, oil, water, grit, scale and dirt. In some cases, NORM-containing solids are entrained in water-oil emulsions. Thus, the composition of the NORM-containing waste material can present difficulties which must be overcome to treat the material.

SUMMARY OF THE INVENTION

Current disposal techniques are directed to treating the entire NORM-containing mass. However it has been found that radioactive substances may, in many cases, be segregated from bulk masses of materials generated, for example, in oil and gas production. It has also been determined that in many such cases NORM-containing materials may be segregated from the bulk of the materials, treated and injected or otherwise disposed of.

Research into the mechanisms for encapsulation and generation of NORM materials has revealed that the distribution of NORM within the solid materials of interest is governed or affected by two factors: (1) physical characteristics such as particle size and (2) the particular type of mineral matrix of the solid materials. In order for NORM to be encapsulated in a precipitate, the matrix must be porous, not an impervious crystal structure. Particle growth, resulting in NORM encapsulation, involves a nucleation process and the type of matrix being formed. A likely location of encapsulated NORM materials is in precipitates such as $BaSO_4$, $CaCO_3$, $CaSO_4$. These materials may be differentiated from, for example, sand, on the basis of various physical characteristics such as density, particle size distribution, and porosity. Further analysis has demonstrated that these forms of solid and mineral matrices can be segregated on the basis of physical characteristics such as particle size distribution and/or density.

It has been discovered that through the use of one or more appropriate solids classification and separation techniques, materials containing higher levels or concentrations of NORM can be separated from the bulk of the materials, thereby reducing the volume of the contaminated, e.g., radioactive, material. In the practice of the invention, it has been found that the majority of contaminated material may be isolated, to form a greatly reduced volume of solid material requiring treatment.

In one embodiment, the invention provides a process for separating a material including a mass of solid fine particles, including particles incorporating NORM. The mass of solid fine particles is classified into samples based upon one or more preselected criteria The level of radioactivity associated with one or more of the samples is determined, enabling separation of the mass into fractions based upon levels of radioactivity associated with the fractions. The term "fine" as used herein refers generally to a mass of solid particles having an average particle size which permits release or extraction of radionuclides using an aqueous solution under the conditions and within the time intervals specified herein to the extent that the activity level of the mass of treated particles is below the specified release criterion, typically a $^{226}$Ra activity level of 30 pCi/gm. The average size of such particles may generally be in the range of from about 2.5 to about 2500 mesh, and in many cases from about 40 to about 80 mesh and generally less than one inch. Thus, the term "fine" as used herein excludes debris such as wood, large rocks or pieces of concrete, broken tools, parts and similar metallic debris, discarded packaging and protective apparel and other similar materials. Classification of the material is the preliminary step that allows for subsequent separation of the material. Classification of the mass of solid fine particles into fractions may be accomplished based upon one or more selected criteria, for example, particle size, particle density, particle hardness, particle composition, particle adhesion, particle cohesion, and other physical characteristics. Classification typically involves sampling the bulk material, and selecting one or more criteria for classification, for example particle size. Classification of the material is normally done on a laboratory or similar small scale. After the material has been classified, the level of radioactivity associated with each samples fraction is determined. This, in turn, allows for possible grouping of the separated sample fractions based upon the level of radioactivity associated with each sample fraction. Separation of the bulk mass of solid fine material into fractions is based upon the sample classification. One or more of the separated fractions of fines may then be selected for further treatment, leaving the remainder of the mass for disposal. By reducing the volume of solid material to be treated, the chemical loading on the treatment facility is significantly reduced, along with the size and capacity of the processing equipment required to treat the material.

In another embodiment, the invention provides a process for releasing or extracting radionuclides from solid fine particles by chemical treatment. In the process, the solid fine particles are contacted with an aqueous solution consisting essentially of water and a chelant in a molar concentration of less than about 0.5 molar, the aqueous solution having a pH of less than 14 and At preferably from about 5 to about 14. As used herein the term "about" is intended to encompass variations within the limits of experimental or measurement accuracy.

The chelant may be a polyamino acid, for example ethylenediaminetetraacetic acid (EDTA) and diethylenetri- aminepentaacetic acid (DTPA) and the molar concentration of the chelant in the solution may be in the range of from 0.01 to 0.5 molar.

In some cases the preferred pH range is from about 12 to about 14; the pH of the solution may be adjusted with an alkali metal hydroxide. Normally the solid fine particles are contacted with the aqueous solution for a period of less than 2 hours. The contact time may range from 30 seconds to 2 hours; in many cases a period of 30 minutes is satisfactory. The fine particles may be contacted with the solution at a temperature of less than 90° C., preferably at a temperature between 25° C. and 90° C. After treatment, the spent solution may be disposed of, for example, by injection into a subterranean formation such as the one from which the materials originated.

The process of the invention may also include the preliminary steps of separating debris from the material, deoiling the material, and grinding the material to reduce the particle size. In summary, the invention provides a means for substantially reducing NORM disposal costs and employing an environmentally friendly technology for NORM remediation.

DETAILED DESCRIPTION

Figure 1:
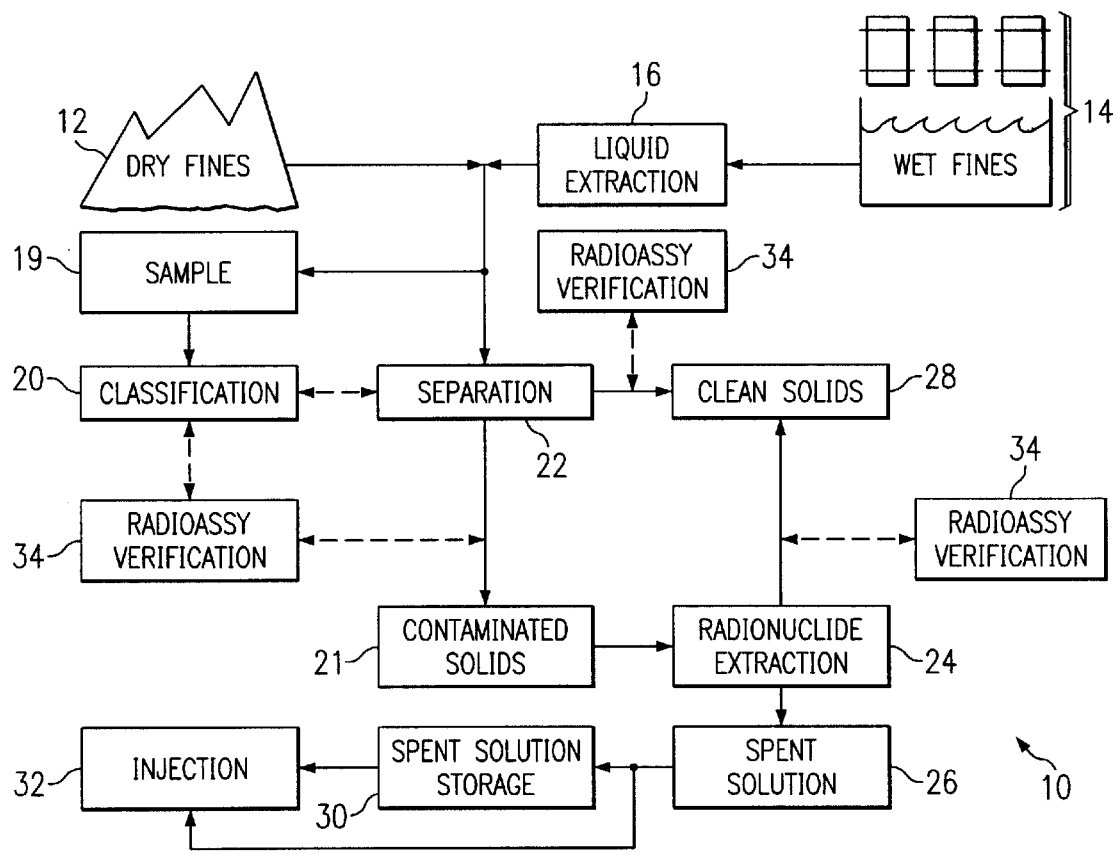
FIG. 1 is a representative overview of the process of the invention.

The invention is generally directed to a method for treatment of solid material containing NORM. As noted above, it has been found that a majority of NORM-containing material may be isolated from the bulk of the solid material through the use of appropriate separation techniques to become a reduced volume of solid material requiring treatment. Typically, the segregated material to be treated includes alkaline earth metal precipitates that require chemical treatment to release or extract encapsulated materials such as radium. Reducing the volume of solid material to be treated in turn reduces the amount of chemicals required for treatment and loading on the treatment facility, thereby reducing the size and capacity of the processing equipment.

In one embodiment, the invention comprises a process for separating a material including a mass of solid fine particles, including particles incorporating NORM, including the steps of: (1) classifying samples of the mass of solid fine particles into fractions based upon one or more criteria; (2) determining the level of radioactivity associated with the samples; and (3) separating the mass into fractions based upon levels of radioactivity associated with the samples. The step of classification typically involves obtaining a relatively small sample or samples of the mass, determining or selecting one or more characteristics of the material that can be utilized to segregate the sample into fractions, and segregating the sample based upon the selected criteria. The mass of solid fine particles may thus be segregated on the basis of for example particle size or density or both. A different criterion may, of course, be selected if the first selected criterion does not prove satisfactory, or an alternative criterion may be tested to provide the optimum segregation. For example, if classification of the solid particles by density results in a greater proportion of the bulk material with activity less than the target 226Ra activity level, for example less than 30 pCi/gm, as opposed to classification on the basis of particle size, it may be more desirable to separate the mass of particles based upon density.—classifying samples of the mass of solid particles based upon one or more criteria; (2) determining the level of radioactivity associated with the samples; and (3) separating the mass in fractions based upon levels of radioactivity associated with the samples.

Thus, for example, the step of separating the mass of particles may be accomplished by screening the solid material into selected size fractions or entraining the mass of fine particles in a liquid medium and separating the mass into fractions based upon the density of the particles. Other methods based upon different criteria, such as particle hardness, abrasion, adhesion, cohesion, or another physical characteristic may also be applied.

Another step may include de-liquefying the mass of solid fine particles, treating the mass of solid fine particles with an agent to induce a phase separation of liquid organic and inorganic materials incorporated with the mass, milling or grinding the mass to achieve a desired particle size and separating debris from the mass.

The invention also provides a process for releasing or extracting radionuclides from solid fine particles. In the process, the solid fine particles are contacted with an aqueous solution consisting essentially of water and a chelant in a molar concentration of less than about 0.5 molar, the aqueous solution having a pH of less than 14 and preferably from about 5 to about 14. The chelant may be a polyamino acid, for example ethylenedieaminetetraacetic acid (EDTA) and diethylenetriaminepentaacetic acid (DTPA) and the molar concentration of the chelant in the solution may be in the range of from 0.01 to 0.5 molar with the pH of the solution in the range of from about 12 to about 14. The pH of the solution may be adjusted with an alkali metal hydroxide, such as potassium hydroxide. The solid fine particles are contacted with the aqueous solution for a period of less than 2 hours, preferably for a period ranging from 30 seconds to 2 hours. In many cases a period of 30 minutes is satisfactory. Preferably, the solution is maintained at a temperature of less than 90° C., often from 25° C. and 90° C. Additionally, it may be desirable or necessary to treat the solid material with an acid solution, for example, hydrochloric acid, to remove iron, carbonates, miscellaneous salts such as sulfides, and other soluble materials prior to treatment with the aqueous chelant solution. In the case where the radioactive materials are encapsulated in carbonates, the acid treatment may eliminate the need for treatment of the material with a chelating agent. After treatment, the spent solution may be disposed of, for example, by injection into a subterranean formation similar to the one from which the materials originated.

Figure 2:
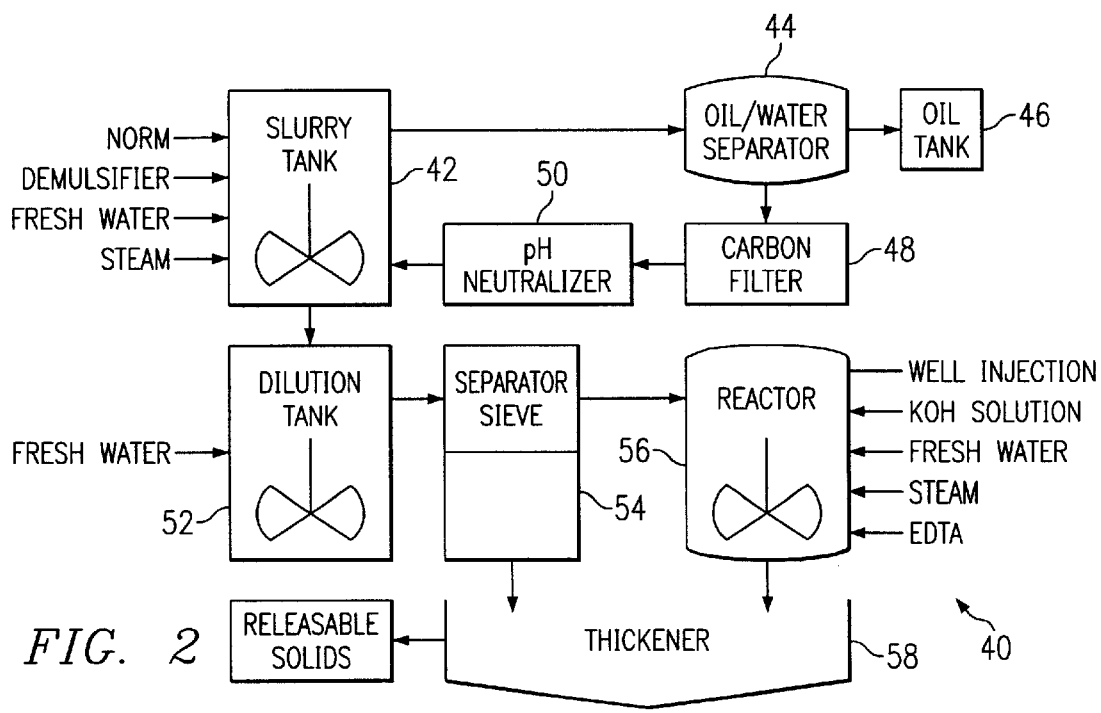
FIG. 2 is a schematic representation of an apparatus and system for practicing the method of the invention.

The solid materials to which the practice of the invention are applicable include NORM-containing scale and similar deposits. Such materials are typically removed from piping, valves, heat exchangers and process equipment by chemical or mechanical means. Other NORM-containing materials may include tank bottoms, de-oiled sediment and like materials. Once collected, depending upon the particular application, it may be necessary to remove debris from the solid materials. Such debris may include rocks, chunks of wood and concrete, discarded packaging and protective clothing and other debris. These materials are subject to pre-removal and separate disposal Referring now to FIG. 1, a schematic overview of an embodiment of a process 10 of the invention is presented. As shown, a mass of solid dry fines 12 including NORM is sampled (step 19); the sample is classified into fractions in step 20. Wet fines 14, such as tank bottoms or similar material, may be deoiled or dewatered in a liquid extraction step 16 prior to sampling and classification. The fractions are radioassayed in step 34, part of the classification. Based upon the determination of the activity level of the classified fractions, the mass of fines may then be separated in step 22 into fractions having differing levels of activity. After separation the clean solids 28 are confirmed, step 34, to be below the target release level, for example, less than a $^{226}$Ra activity level of 30 pCi/gm, and are released. Contaminated solids 21 not meeting the release criterion, are treated in a radionuclide extraction process 24 with an aqueous solution as set forth in detail below. The treated solids are confirmed to be below the target release level, step 34, and discharged as clean solids 28. Spent solution 265, containing the extracted radionuclides, is directed to spent solution storage 30 then injected 32, or is directly injected, into a subterranean formation, for example into the formation such as the one from which the naturally occurring radioactive material originated Referring now to FIG. 2, an exemplary apparatus and system 40 for releasing radionuclides from a fraction of a mass of fine solid particles, separated in accordance with the method of the invention is illustrated. The separated NORM-containing fine solids, ground and/or dewatered as necessary, are fed to a slurry tank 42 along with fresh water, demulsifier and steam. An upper stream from the slurry tank is fed to an oil/water separator 44 for phase separation of entrained oil. Oil from the separator 44 flows to oil storage tank 46 and the water from the separator 44 is recycled through a carbon filter 48, a pH neutralizing tank 50, and returned to slurry tank 42.

A bottom stream is fed from the slurry tank 42 to a dilution tank 52. Fresh water is added to dilute the stream as required, typically in a 5:1 ratio of water to solids. Dilution ratios ranging from 1:1 to 10:1 water to solids may be used, depending upon the application.

The diluted slurry from the dilution tank 52 is fed to a separator sieve 54 for size separation of the entrained solids. Although as illustrated, particle size separation is accomplished with a sieve, a variety of size classification devices may be used such as pressure filters, vacuum filters, gravity filters and various types of screens. It is also contemplated that the separation could be done on the basis of particle density in which case, centrifuges, hydrocyclones, laminar flow separators, clarifiers and similar devices and techniques could be used.

A stream containing the oversized fraction from separator sieve 54 is fed to reactor 56 along with an alkali hydroxide such as possium hydroxide and an aqueous solution of the potassium or sodium salt of ethylenediaminetetraacetic acid (EDTA) in order to maintain its molar concentration of between 0.01 and 0.5. Higher or lower concentrations may be used, depending upon the specific application, however, it is desirable to use a low concentration in order to minimize chemical costs. Preferably, the EDTA concentration is maintained in a range less than 0.5 molar, more preferably, in the range of from about 0.01 to about 0.30 molar; most preferably the EDTA concentration is maintained in the range from about 0.05 to about 0.1 molar.

The reactor solution is maintained at a pH from about 5 to about 14 and typically in a range of from about 8 to 14. More preferably the pH of the solution is maintained in the range of from about 12 to 14; most preferably, the pH is maintained in a range from 13 to 14. The reactor temperature is maintained below 95° C., and typically in the range of from 25° C. to 95° C.

The mixture in the reactor is agitated for a predetermined period, typically for a period of less than 3 hours. Normally, a reaction time of from 30 seconds to 60 minutes is adequate. Preferably, the reaction time is in the range of from 2 to 60 minutes and in many cases, a reaction time of about 30 minutes is satisfactory. If the concentration of the chelating agent is low, or the pH is out of range, additional EDTA and/or KOH may be added to the reaction tank 56.

After the desired reaction time, up to 10 rinse cycles with fresh water may be employed. A bottom stream from the reactor tank 56 is fed to a thickener 58 where the treated, releasable solids are separated. During or subsequent to the discharge of the bottom stream, the solids may be sampled and tested for activity level. The samples may be grab samples, however, it is contemplated that automatic sampling may be used. Thickener 58 may be a filter press, centrifuge or a similar dewatering device. Water from the thickener 58 is recycled to the dilution tank 52. Spent solution from the reactor tank 56 is withdrawn and disposed of by, for example, well injection.

The following examples are set forth to further illustrate the invention, but do not in any way limit the scope of the invention.

EXAMPLE 1

Figure 3:
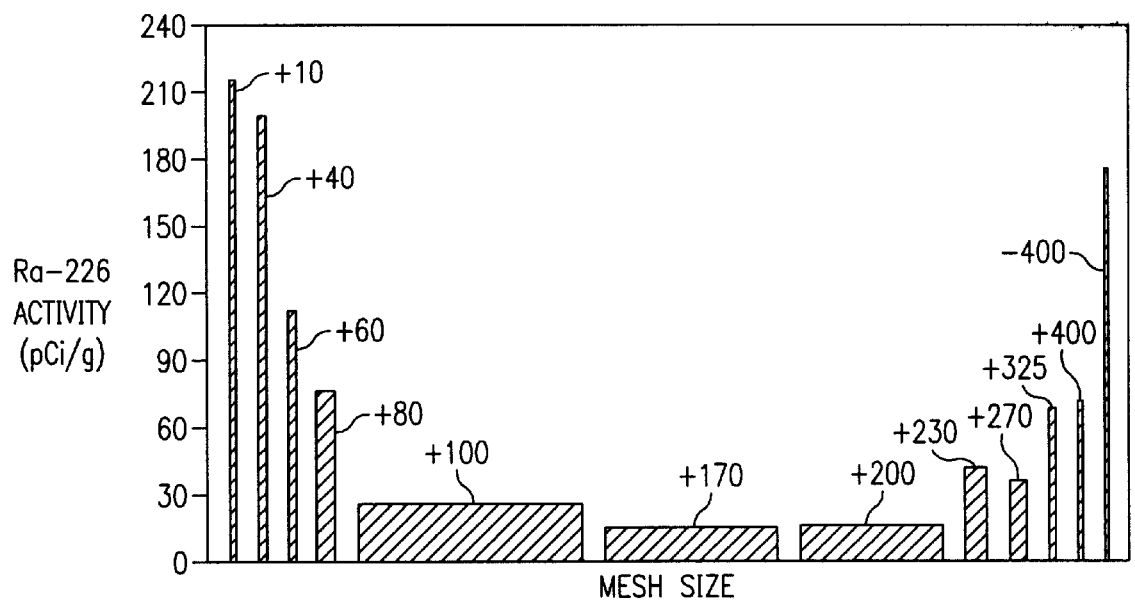
FIG. 3 is a graphic representation of the levels of $^{226}$Ra activity in selected size fractions of a NORM-containing solid waste material.

A deoiled NORM-containing material recovered from an oil drilling site was dried for approximately eight hours to aid in screening. The material was screened with a Ro-Tap shaker screen through ascending mesh sizes in a two-stage test run. In the first stage, the material was separated using 10, 40, 60, 80, 100, 200, and 270 mesh sieves. In the second stage, the material was separated using 100, 170, 200, 230, 270, 325 and 400 mesh sieves. The samples were rinsed with fresh water. Using a gamma detector, the $^{226}$Ra activity level (pCi/gm) was determined for the sized fractions. The combined results of the test are set forth in TABLE 1 below and in a bar chart in FIG. 3, where the area of a bar corresponding to a given sieve size is proportional to the mass of the segregated fraction.

TABLE 1

| Mesh Size | $^{226}$Ra Activity (pCi/gm) | Weight % of Total |
|---|---|---|
| +10 | 214.96 | 5.20 |
| +40 | 198.75 | 6.80 |
| +60 | 111.42 | 3.80 |
| +80 | 75.03 | 7.00 |
| +100 | 25.35 | 34.80 |
| +170 | 14.99 | 15.80 |
| +200 | 16.03 | 13.80 |
| +230 | 41.38 | 5.40 |
| +270 | 35.26 | 3.30 |
| +325 | 66.58 | 1.60 |
| +400 | 70.39 | 1.20 |
| −400 | 175.26 | 1.20 |

In the above-illustrated example, 64.4% of the fine solid material met the target release criterion, which in this case was less than 30 pCi/gm.

EXAMPLE 2

Six samples of a deoiled NORM-containing material recovered from an oil drilling site were separated using a 24" diameter vibrating screen with 100 and 200 mesh screens into +100 mesh, −100 to +200 mesh and −200 mesh fractions and rinsed. Using a gamma detector, the $^{226}$Ra activity level (pCi/gm) was determined for each of the sized fractions. The results of the tests were averaged and are set forth in TABLE 2 below.

TABLE 2

|  | Gross Sample | +100 Mesh | −100 Mesh +200 Mesh | −200 Mesh |
|---|---|---|---|---|
| Weight % | 100% | 4.6% | 64.6% | 30.8% |
| $^{226}$Ra Activity (pCi/gm) | 61.26 | 329.86 | 14.51 | 27.05 |

Of the total bulk material, 95.4% (all of the −100 mesh material) showed an activity level below the target of 30 pCi/gm.

EXAMPLE 3

Figure 4:
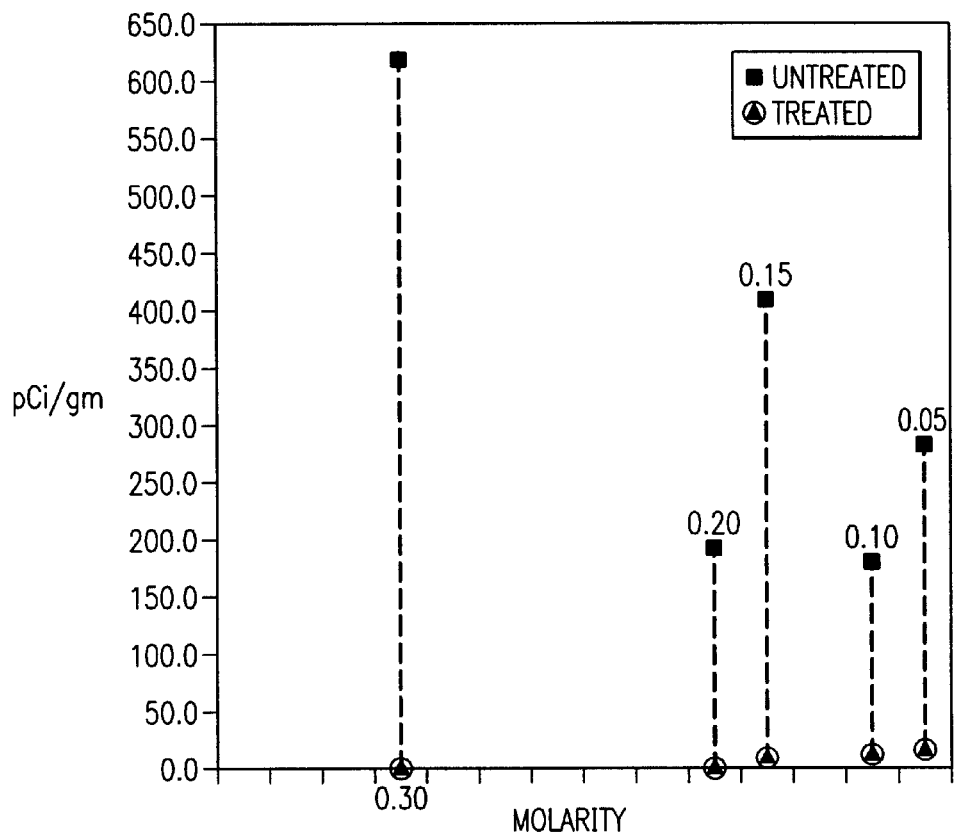
FIG. 4 is a graphic representation of $^{226}$Ra activity in various treated and untreated NORM-containing solid waste materials.

Samples of deoiled NORM-containing waste solids were treated in a pilot plant with an aqueous solution of EDTA to extract radionuclides. The samples were treated at different concentrations of EDTA to determine the influence of EDTA concentration on the effectiveness of the treatment. In each case, 1000 lbs of the solids were slurried with fresh water solution of KOH and the chelant to produce a 30 weight percent solid to liquid slurry. The pH of the solution was verified to be above 13. The temperature of the slurry was raised to 170° F., then so maintained for 30 minutes. The activity level of the solids was measured before and after treatment. The results are set forth in TABLE 3 below and graphically illustrated in FIG. 4.

TABLE 3

| EDTA (Molarity) | 0.05 | 0.10 | 0.15 | 0.20 | 0.30 |
|---|---|---|---|---|---|
| $^{226}$Ra Activity(pCi/gm) Untreated | 275 | 170 | 440 | 175 | 630 |
| $^{226}$Ra Activity(pCi/gm) Treated | <30 | <30 | <30 | <30 | <30 |

As can be seen from the foregoing results, effective treatment of the NORM-containing materials can be accomplished with an aqueous solution having an EDTA concentration in the range of from 0.01 to 0.50 M.

EXAMPLE 4

NORM-containing waste material from an oil recovery site is screened to remove debris such as wood, concrete and discarded packaging and protective clothing. The screened waste material is deoiled and ground in a ball mill to reduce the particle size. The mass of fines has a $^{226}$Ra activity 65.2 pCi/gm. After grinding the material is sampled and classified based upon particle size into +100 mesh and −100 mesh fractions. The +100 mesh fraction constitutes 23% by weight of the total solids. Samples of the classified fractions are tested for radioactivity. The +100 mesh material has a $^{226}$Ra activity of 279 pCi/gm while the −100 mesh material has a $^{226}$Ra activity of 20 pCi/gm. The −100 mesh material, representing 77% by weight of the total solids meets the release criterion of less than 30 pCi/gm. The mass of fines is then screened into +100 mesh and −100 mesh fractions.

The +100 mesh solids are slurried with water at a 4.8 to 1 ratio in a dilution tank. The slurry is then transferred to an agitated reaction vessel. The pH of the slurry is adjusted to 13.1 and sufficient EDTA is added to result in a molar concentration of EDTA of 0.5 in the slurry. The slurry is heated to a temperature of 72° C. and agitated for a period of 32 minutes after which the spent solution is drawn off and pumped to a well injection facility. The remaining solids are transferred to a thickener for concentration. Solution from the thickener is returned to the dilution tank. The treated solids from the thickener have a $^{226}$Ra activity of 21 pCi/gm, below the target release criterion of 30 pCi/gm.

EXAMPLE 5

NORM-containing waste material from an oil recovery site is screened to remove debris such as wood, concrete and discarded packaging and protective clothing. The screened waste material is deoiled and ground in a ball mill to reduce the particle size. After grinding, the fine solids are classified on the basis of particle size into +60 mesh and −60 mesh fractions. The +60 mesh fraction constitutes 20% by weight of the total solids. Samples of the classified and unclassified fractions are tested for $^{226}$Ra activity. The mass of fines solids has a $^{226}$Ra activity 55.2 pCi/gm. The +60 mesh material has a $^{226}$Ra activity of 217 pCi/gm while the −60 mesh material has a $^{226}$Ra activity of 15 pCi/gm. The −60 mesh material, representing 80% by weight of the total solids meets the release criterion of 30 pCi/gm.

The mass of solids is separated by screening into +60 and −60 mesh fractions. The activity level of the −60 mesh fraction is verified and the material is classified as a clean solid. The +60 mesh solids are slurried with water at a 5:1 ratio in a dilution tank. The slurry is then transferred to an agitated reaction vessel. The pH of the slurry is adjusted to 13.3 and sufficient EDTA is added to result in a molar concentration of EDTA of 0.05 in the slurry. The slurry is heated to a temperature of 76° C. and agitated for a period of 36 minutes after which the spent solution is drawn off and pumped to a well injection facility. The remaining solids are transferred to a thickener for concentration. Solution from the thickener is returned to the dilution tank. The treated solids from the thickener have a $^{226}$Ra activity of 17 pCi/gm, below the target release criterion of 30 pCi/gm.

EXAMPLE 6

NORM-containing waste material from an oil recovery site is screened and deoiled. The waste material consists primarily of solid fines, including sand, oil and scales, including barium sulfate. The mass of solid fines is classified on the basis of particle density into fractions having densities above and below 3 and tested for $^{226}$Ra activity. The solids comprising the lighter fraction, i.e. having a density less than 3 have a $^{226}$Ra activity of 24 pCi/gm, which is below the release criterion. The denser solids have a $^{226}$Ra activity of 176 pCi/gm and constitute 22% by weight of the total fine solids. Based upon the classification and determination of the activity levels of the two fractions, the mass of fines is slurried and separated using a centrifuge into fractions having densities above and below 3.

The denser solids are slurried with water at a 5:1 ratio in a dilution tank. The slurry is then transferred to an agitated reaction vessel where the pH of the slurry is adjusted to 13.4 and sufficient EDTA is added to result in a molar concentration of EDTA of 0.01 in the slurry. The slurry is heated to a temperature of 71° C. and agitated for a period of 42 minutes after which the spent solution is drawn off and pumped to a well injection facility. The remaining solids are transferred to a thickener for concentration. Solution from the thickener is returned to the dilution tank. The treated solids from the thickener have a $^{226}$Ra activity of 18 pCi/gm, below the target release criterion of 30 pCi/gm.

As will be appreciated, the equipment used to practice the process may be truck or trailer mounted modular units for ready transport to and between remediation sites. In many cases, solid materials including a NORM-containing fraction are stored on site in barrels, tanks or the like prior to treatment. The use of a mobile apparatus to treat such materials on site is advantageous in terms of costs and flexibility as compared with transporting the material to a fixed location for remediation.

While this invention has been described in reference to illustrative embodiments, the description is not to be construed in a limiting sense. Various modifications and combinations of the illustrative embodiments, as well as other embodiments of the invention, will be apparent to persons skilled in the art upon reference to the description.

We claim:

1. A process for separating NORM from material comprising a solid matrix that incorporates NORM, the process comprising the steps of:

sampling the material to obtain samples of the material;

determining the level of radioactivity associated with each sample;

separating the material into fractions based upon levels of radioactivity associated with each sample; and extracting radionuclides from the fractions exhibiting radioactivity above a pre-determined target level of radioactivity, wherein at least one of the extracted fractions comprises a solid matrix that incorporates NORM.

2. The process of claim 1, wherein the solid matrix further comprises scale, thermal or chemical precipitates or deposits, or salt or mineral crystals, or combinations thereof.

3. The process of claim 1, further comprising the step of extracting liquid from the material prior to sampling.

4. The process of claim 1 wherein the step of separating the material into fractions further comprises the step of screening the solid material into selected size fractions.

5. The process of claim 1 wherein the step of separating the material into fractions further comprises the step of entraining the material in a liquid medium and separating the material into fractions based upon the density of each sample.

6. The process of claim 1 further comprising the step of de-liquefying the material.

7. The process of claim 1 further comprising the step of treating the material with an agent to induce a phase separation of liquid organic and inorganic materials incorporated with the mass.

8. The process of claim 1, wherein the process is performed with a mobile apparatus.

* * * * *